United States Patent [19]

Lupke

[11] Patent Number: 5,296,188

[45] Date of Patent: * Mar. 22, 1994

[54] METHODS FOR FORMING TUBING UTILIZING SUCTION AND PNEUMATIC PRESSURE AT THE SURFACE OF THE COOLING PLUG

[75] Inventor: Manfred A. A. Lupke, Concord, Canada

[73] Assignee: Corma, Inc., Concord, Canada

[ * ] Notice: The portion of the term of this patent subsequent to Feb. 16, 2010 has been disclaimed.

[21] Appl. No.: 942,774

[22] Filed: Sep. 10, 1992

Related U.S. Application Data

[63] Continuation-in-part of Ser. No. 793,332, Jan. 14, 1992, abandoned.

[51] Int. Cl.⁵ .............................................. B29C 47/90
[52] U.S. Cl. ...................... 264/508; 264/511;
264/515; 264/558; 264/566; 264/568; 264/571;
264/173; 264/209.4; 425/326.1; 425/393;
425/396
[58] Field of Search ................ 264/508, 511, 506–507,
264/173, 209.8, 209.3, 209.4, 237, 514, 571, 515,
558, 566, 568; 425/326.1, 393, 466, 380, 396

[56] References Cited

U.S. PATENT DOCUMENTS

| | | |
|---|---|---|
| 3,212,135 | 10/1961 | Branscum . |
| 3,743,456 | 8/1971 | Cini . |
| 3,959,427 | 5/1976 | Van Zon ............................ 264/508 |
| 4,365,948 | 12/1984 | Chaplain . |
| 4,545,751 | 10/1985 | Lupke . |
| 4,555,230 | 11/1985 | Lupke . |
| 4,663,107 | 5/1987 | Takada . |
| 4,789,327 | 12/1988 | Chan et al. .......................... 425/466 |
| 4,808,098 | 2/1989 | Chan . |
| 4,846,660 | 7/1989 | Drossbach ...................... 425/326.1 |
| 4,865,797 | 9/1989 | Jarvenkyla ......................... 264/508 |
| 4,873,048 | 10/1989 | Jarvenkyla ......................... 264/508 |
| 5,023,029 | 6/1991 | Lupke ................................ 264/508 |
| 5,186,878 | 2/1993 | Lupke ............................. 264/209.4 |

FOREIGN PATENT DOCUMENTS

| | | |
|---|---|---|
| 2247661 | 10/1974 | France . |
| 45-27915 | 9/1970 | Japan .................................. 264/173 |
| 60-124240 | 7/1985 | Japan . |
| 60-132726 | 7/1985 | Japan ............................. 264/209.3 |
| 85/02144 | 11/1984 | PCT Int'l Appl. . |
| 88/05377 | 1/1988 | PCT Int'l Appl. . |
| 1258181 | 12/1971 | United Kingdom . |

*Primary Examiner*—Jeffery Thurlow
*Attorney, Agent, or Firm*—Beveridge, DeGrandi, Weilacher & Young

[57] ABSTRACT

The invention concerns a cooling plug for sizing the interior surface of thermoplastic extruded pipe. Vacuum and/or pneumatic pressure is applied at the surface of the plug. The pneumatic pressure may cause the inner wall to balloon outwardly to form bells within a mold or within an outer wall, to fit into corrugations of an outer corrugated tube, etc. The vacuum may be used to pull the inner wall back to the surface of the plug after application of pneumatic pressure.

10 Claims, 11 Drawing Sheets

FIG. 12

METHODS FOR FORMING TUBING UTILIZING SUCTION AND PNEUMATIC PRESSURE AT THE SURFACE OF THE COOLING PLUG

RELATED APPLICATIONS

This application is a continuation-in-part of U.S. patent Ser. No. 07/793,332, filed Jan. 14, 1992, which is a national phase of International application No. PCT/CA90/159. U.S. Ser. No. 07/793/332 is abandoned as of the filing of the present application.

BACKGROUND OF THE INVENTION

1. Field of the Invention

The invention relates to apparatus for molding thermoplastic tubing in which a sizing plug is used to define internal diameter of the tubing. The invention is especially useful in the production of ribbed or double walled tubing.

2. Description of prior art

The apparatus may be of the type in which tubing of thermoplastic material is continuously extruded into a travelling tubular mold tunnel about a mandrel and is confined to the shape of the pipe by a sizing plug downstream of the mandrel. Such a plug may, on some occasions, when extrudate does not easily flow fully into the mold, be heated to increase the fluidity of the extrudate so that it may more easily flow into recesses of the mold, for example under the influence of suction from the bases of the recesses. However, more usually the extrudate is provided in sufficiently molten condition to flow fully into the mold. In this case it is necessary to provide a sizing plug to define the inner wall of the pipe so as to confine the extrudate in an appropriate casting cavity.

A simple sizing plug defining the inner wall of a tube is described by Chaplain in U.S. Pat. No. 4,365,948 issued Dec. 28, 1982. Usually some temperature control is desirable in a sizing plug and Lupke in U.S. Pat. No. 4,545,751 issued Oct. 8, 1985 describes a more sophisticated arrangement. In that arrangement the sizing plug does not define an inner wall of the pipe but is used to distribute air into the inside of corrugated tubing. Pressurized air is delivered through a central core coaxial with an extrusion nozzle. Hot peripheral air is drawn off and central cool air is permitted to leave the plug to contact the inside of corrugated pipe, the plug being inwardly spaced from the inner pipe wall. Such arrangement is suitable for use where corrugated tubing is involved but the range of temperature in cooling may be limited. The arrangement is less suitable where ribbed tubing is to be produced since the plug, in that case, should be a plug contacting the inside wall of the pipe to confine it into a casting region. When this is the case, air cannot be released between the plug wall and the inner pipe wall for cooling. A cooling plug suitable for use in the formulation of ribbed pipe is disclosed by Lupke in his later U.S. Pat. No. 4,555,230 issued Nov. 26, 1985. In that patent Lupke does not attempt to use released cooling air but provides within and near the surface of a follower plug, a helical coil of tubing through which cooling fluid may be passed.

Apparatus for the production of plain single walled tube with no ribs or corrugations usually comprises means for extruding a parison into a mold the temperature of which may be adjusted by the use of a water jacket. No sizing plug is used to form the inner surface of the tube but gas pressure or the like may be used to press the tube against the outer mold. The inner wall of tube thus formed may not be totally even due to a variety of reasons such as uneven shrinkage during setting of the tube. Moreover, it would be advantageous to be able to produce such tube at greater speeds.

A sizing plug is provided to form a smooth inner wall to the formed tube but, when ribbed pipe is formed, some problems have occurred in obtaining a smooth inner wall. The reason is due to the variation in the requirement of plastic material due to the varying wall thickness for the ribs and troughs. Thus, more plastic material will be required to form the ribs than that part of the tube wall (trough) between ribs. Stresses are set up in the apparatus at the point of filling the mold blocks due to this varying demand for plastic material. Moreover, unevenness due to shrinkage is accentuated where thickness of the tube varies, as for example, where there are ribs and troughs.

U.S. Pat. No. 5,023,029 of the same inventor and issued Jun. 11, 1991, to Manfred A. A. Lupke, describes and claims the use of an accumulator chamber for plastic material at the point of mold filling. The accumulator chamber is intended to even out pressure variations and reduce stresses. The use of such an accumulator chamber is very useful in its intended purpose but there still may be some effects of pressure variations to be seen on the inside walls of the tube.

Thus, the inside wall of the tube may have a slight wave formation, tending to apparently bulge inwardly between the ribs where the pressure of extrudate is greater, and tending to actually recede to form an indentation opposite a rib where the pressure of extrudate is less. This effect is accentuated when an accumulator chamber is not used.

When double walled corrugated tubing is to be produced difficulties have been encountered due to pressure within the corrugations. If this pressure is too low, the inner wall may bow into the corrugation forming an undesirable concavity in the inner wall. If the pressure is too high, the inner wall may bow away from the corrugation forming an undesirable bulge in the inner wall.

U.S. Pat. No. 5,186,878 describes and claims method of applying vacuum applied at the surface of a cooling plug to mitigate rhythmic bulges and indentations in the inner tube wall.

U.S. Pat. No. 4,808,098 issued Feb. 28th, 1989 to Chan et al discloses a cooling plug having two annular distributing grooves, the grooves being independently connected to a vacuum source and one groove being axially remote and the other being axially close to the extrusion orifice, whereby the intensity of vacuum along the plug may be varied.

The present invention relates to an improvement in the method of U.S. patent application Ser. No. 860,269 whereby suction is alternated with pressure, when, for example, bells are required in the tube.

SUMMARY OF THE INVENTION

Thus, according to the invention there is provided a method of forming an inner wall of seamless thermoplastic tube, comprising sizing the inner wall by means of a sizing plug within the formed tube and applying suction from within said plug through communication means to an inner wall of the formed tube to apply suction to the inner wall of the tube, and, at intervals when an enlarged diameter is required for the tube, alternatively applying pressure through said communications means. The interval when enlarged diameter is required may be during formation of a bell in the tube. Preferably, a groove or grooves are present on the sizing surface of the plug to distribute the suction or the pressure over its surface.

The method of the invention is especially applicable to tube molding apparatus of the travelling mold type especially when that apparatus is for forming ribbed or double walled corrugated tube. However, a reason for this is that imperfections in the inner wall of such tubing may tend to be more pronounced due to differences in requirements for extrudate along the mold. When imperfections arise in the inner wall of plain wall tubing, the apparatus and method of the invention are also useful.

The suction applied at the surface of the sizing plug may be used to draw cooling water or other liquid, from the interior of the plug through orifices provided to the tube sizing surface. Such water or other liquid may be useful for lubrication or other purposes at the interface between the inner wall of the formed tube and the plug.

BRIEF DESCRIPTION OF THE DRAWINGS

Embodiments of the invention will now be described by way of example with reference to the accompanying drawing in which.

DETAILED DESCRIPTION OF PREFERRED EMBODIMENTS

Referring to the drawings the apparatus comprises a pair of complementary mold assemblies. Each mold assembly comprises articulately interconnected mold blocks 16.

The mold blocks 16 may such as to mold pipe of any desired configuration. For example, mold blocks 16 may be such as to mold annularly ribbed pipe or helically ribbed pipe, double walled pipe, or other configurations. However, it is desired that the inner wall of the pipe be smooth.

The mold assemblies may be operatively positioned to locate an extrusion head being operatively coupled to the nozzle of an extrusion machine, which maybe of conventional form. If required, the mold assemblies may be moved away from the extrusion head in order to provide access to it for maintenance, or other reasons.

The extrusion head comprises an axially extending tubular portion 26 which is surrounded by a tubular member 27, one end portion of which screwthreadedly supports an outer member 22 of an annular extrusion nozzle. The tubular portion 26 carries an inner member 29 of the extrusion nozzle having a frustoconical form which terminates at an annular orifice 31 which communicates with the annular space 32 between the pipe 27 and the portion 26. This annular space 32, in turn, communicates with the output of the extrusion machine (not shown) passing the thermoplastic material, such as PVC to the extrusion nozzle 24.

Figure 1:
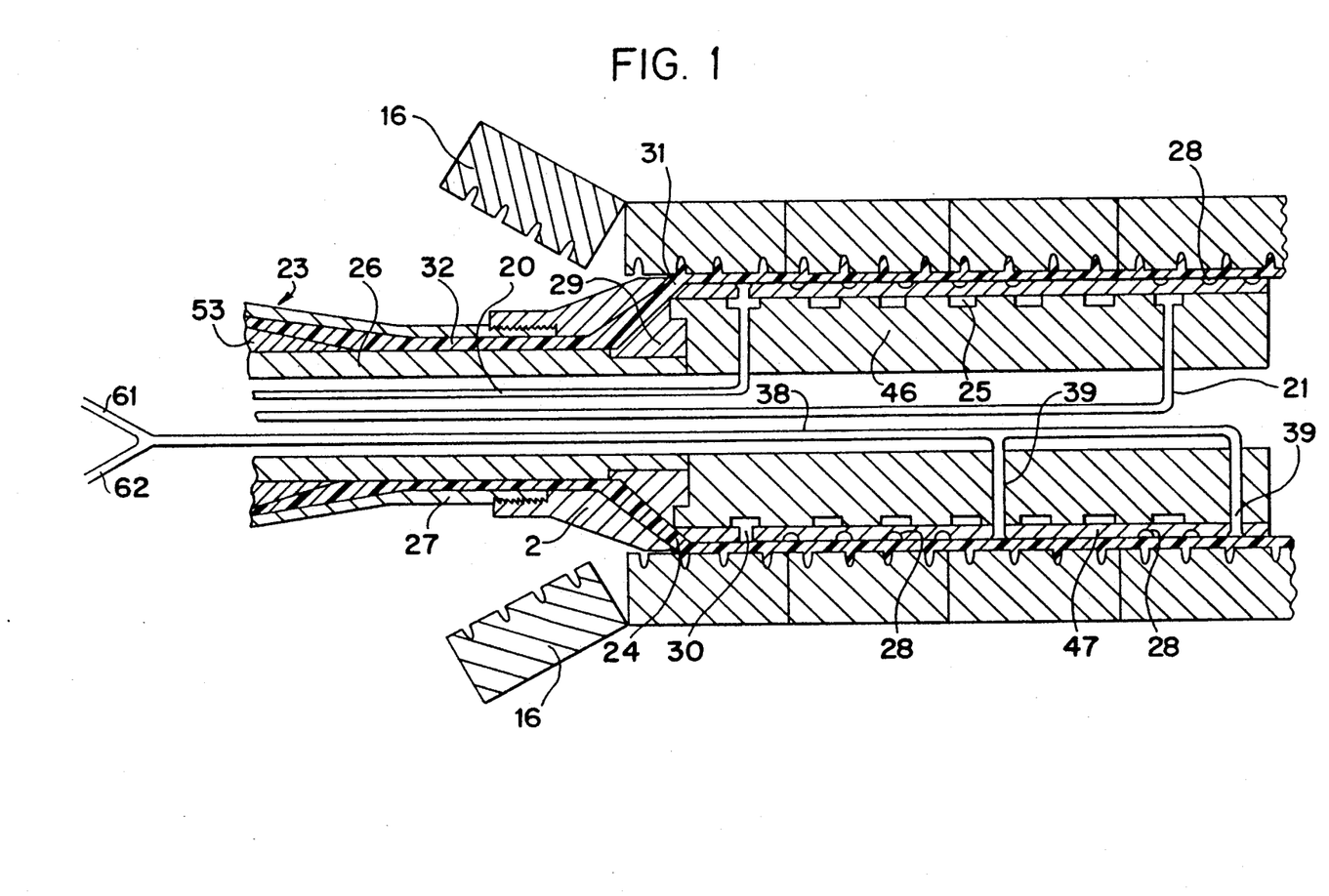
FIG. 1 is a sectional view of an extrusion nozzle of apparatus for molding thermoplastic pipe in a travelling mold tunnel, showing part of the mold tunnel and a cooling plug according to the invention.

Downstream of the extrusion nozzle the extrusion head carries, on an extension of tubular portion 26, a generally cylindrical sizing plug 46. The plug 46 defines the inner wall of pipe formed by the thermoplastic material leaving the extrusion nozzle 24 to be molded by mold blocks 16. When the pipe is to be single walled annularly ribbed pipe, as shown in FIG. 1, plug 46 forms an inner wall of a mold cavity and thermoplastic material is forced into troughs of the mold blocks 16 to form annular ribs on the outer surface of the resulting pipe.

Cooling of plug 46 may be any convenient means for example, by flow of cooling water from conduit 20 through channels 25 arranged internally of and extending over, the length of the plug 46. Return flow of cooling water may be through conduit 21 through core 53 of tubular member 26. The cooling arrangements for plug 46 form no part of the present invention and many variations in such cooling arrangements are possible for simplicity. Again this may be through any conveniently located return conduit.

Figure 3:
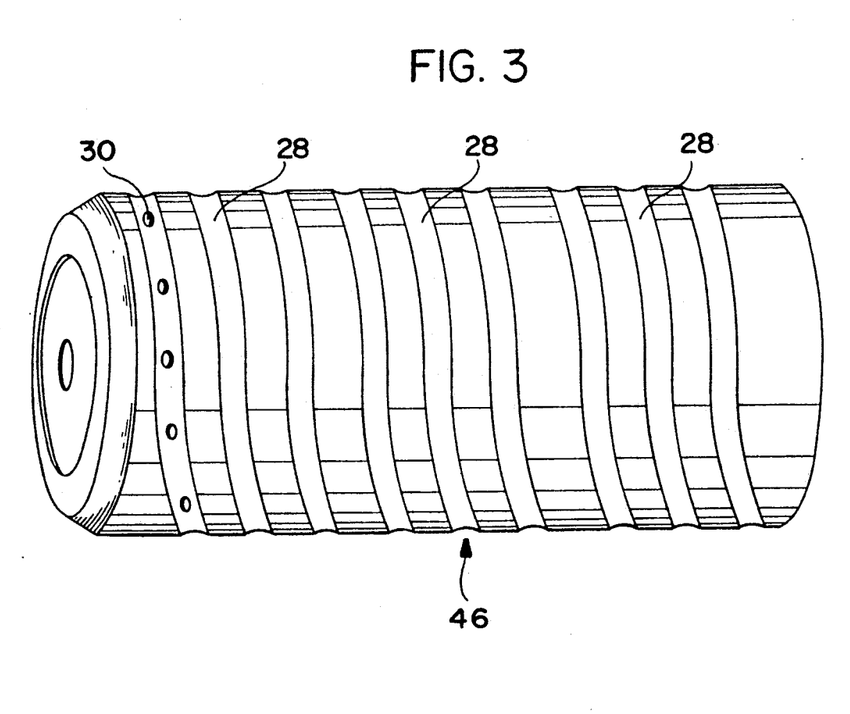
FIG. 3 is a view of a cooling plug such as that of FIG. 1.
Figure 11:
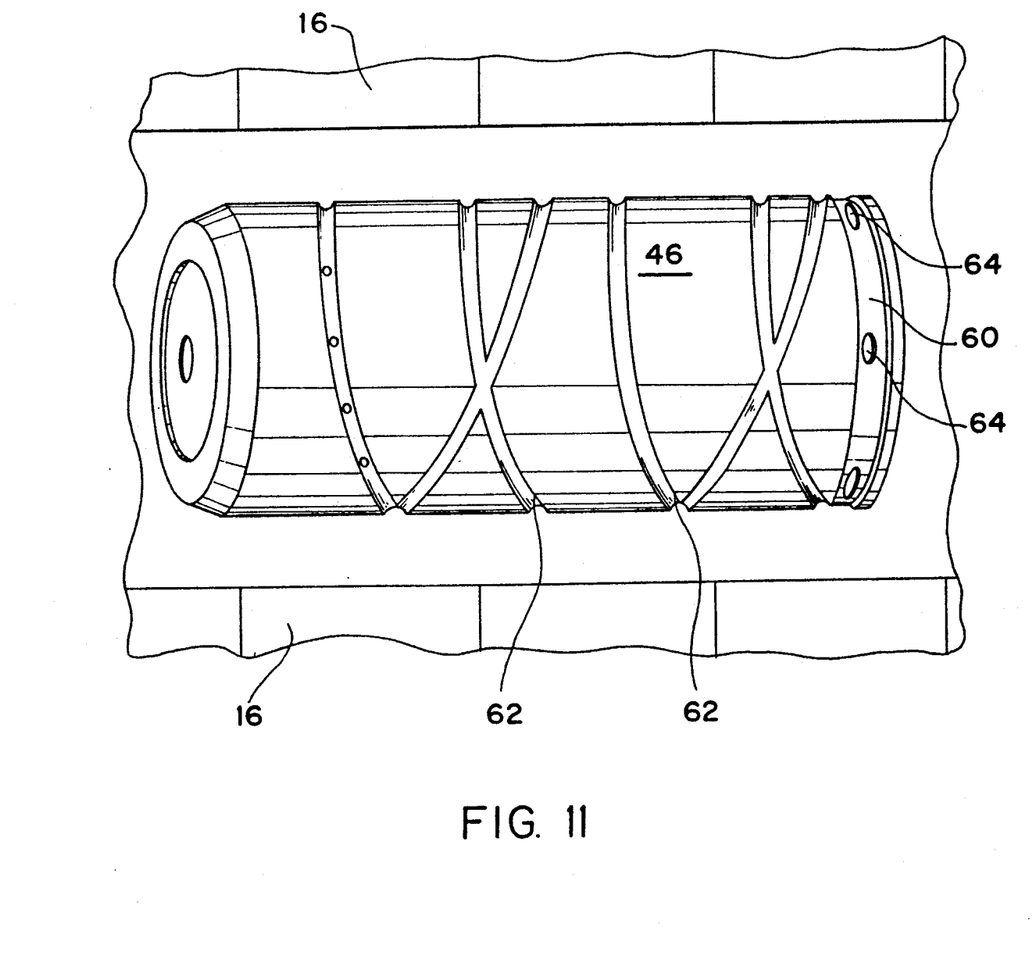
FIG. 11 shows a further embodiment of a cooling plug.

The cooling plug 46 conveniently comprises a core 45 connected at one end to inner member 29 having a channel 25 in its outer surface for cooling liquid, for example, water. Core 45 has an axial bore communicating with, and extending bore 53 of extrusion head 23. Channel 25 may be of helical form or any other convenient shape. Core 45 may be covered by sleeve 47 to confine cooling liquid to channel 25. Sleeve 47 has a generally smooth outer surface to size the inner wall of tubing in the mold, but is provided with a channel or channels 28 to distribute suction or pressure over the outer surface of sleeve 47. One form of channel 28 is illustrated in FIG. 3 as a helical channel has a small cross-section in comparison with the cross-section of cooling channel 25 so that there is little danger of plastic extrudate being drawn into the suction channel 28 when suction is applied. In fact, the width of channel 28 may be as small as 0.010 inches. Another shape of channel 28 is as shown in FIG. 11 which shows a pair of helical channels having opposite twists so that they cross each other. Other shapes of channel are, of course, possible. Channel 28 communicates with a single source of suction (not shown) or with a source of pressure (not shown) via branches 61, 62 of conduit 38 which opens into channel 28 at suction or pressure port 39. Preferably, each channel 28 is located to apply suction downstream of the point at which cooling is started so that plastics material will not be drawn into channels 28. Equally channel 28 should be located such that pressure will cause the desired enlargement of the tube. This channel 28 must be located at a point where the tube is still soft enough to be formed.

Figure 12:
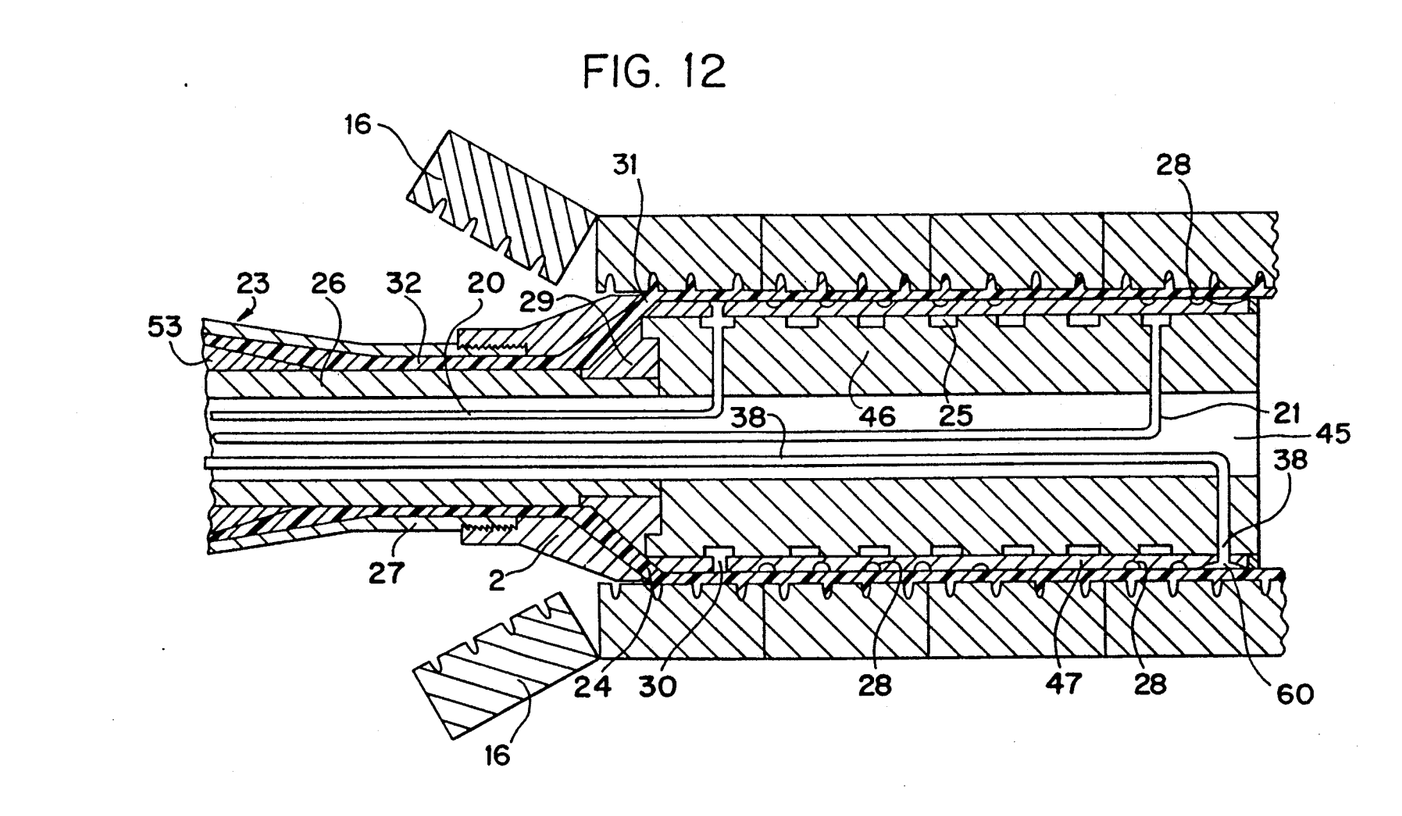
FIG. 12 is a view similar to FIG. 1 but illustrating a one stage process.

When suction or pressure is applied at the downstream end of the plug 46, the diminution in strength is progressive toward the upstream end. Thus, in FIG. 1, a branched suction/pressure channel 38 is shown having two ports 39 to the surface of the plug 46. Upstream of the ports 39 the suction/pressure effect diminishes in channel 28. FIG. 12 shows another embodiment having a single port 39. Upstream of that port, the suction/pressure diminishes in channel 28.

It may be advantageous to provide small communicating channels 30 between cooling liquid channel 25, or other liquid reservoir in the cooling plug, and the external surface of the plug 46. Suction applied through channel 28 will thus tend to draw small amounts of liquid to the outside of the plug to have a possible lubricating and/or smoothing effect on the tubing wall.

When annularly ribbed pipe is being formed as described and claimed in U.S. Pat. No. 5,023,029 issued Jun. 11, 1991 to Manfred A. A. Lupke, it is convenient if conduit 38 opens to channel 28 immediately downstream of the accumulator chamber.

Figure 4:
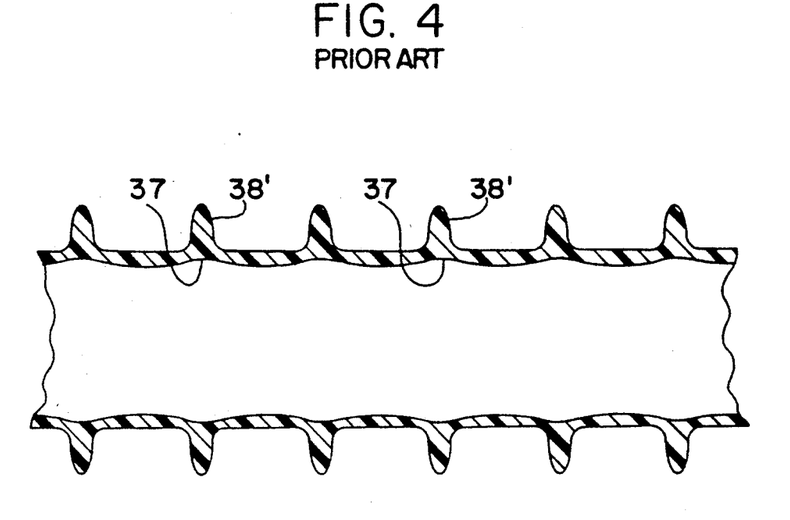
FIG. 4 is a sketch of a longitudinal section of prior art tubing showing unevenness of the interior wall.
Figure 5:
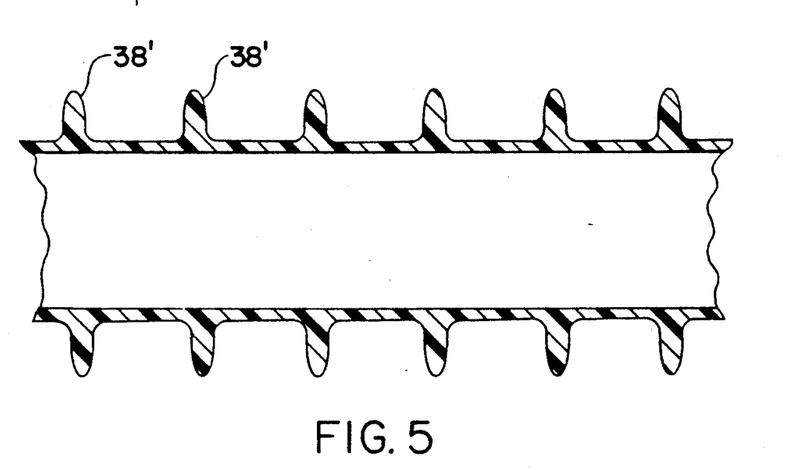
FIG. 5 is a sketch similar to that of FIG. 4 showing the desired profile of the inner wall.

In conventional operation, there is a tendency for the inner wall of the tube to be formed as shown in the exaggerated sketch of FIG. 4. When suction is applied to the inner wall of the tube, especially sufficiently far upstream that the plastics material is easily flowable the tendency to form indentation 37 opposite each rib 38' of tube may be mitigated.

Figure 2:
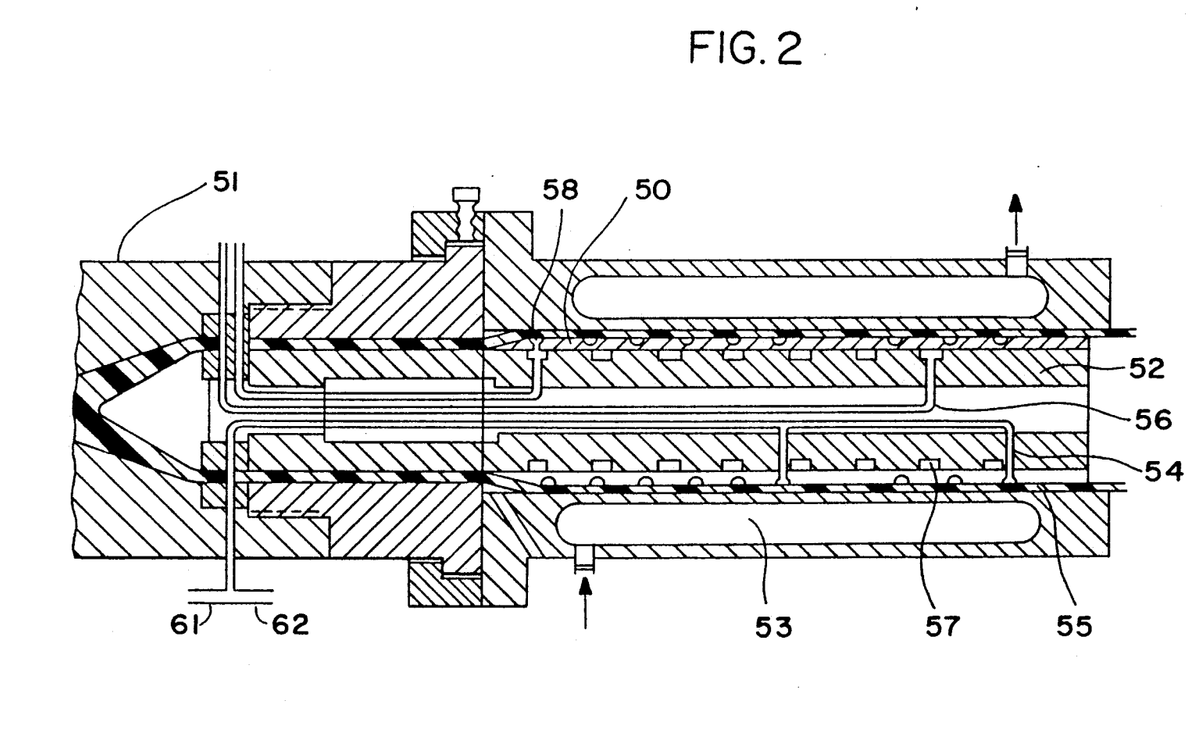
FIG. 2 is a sectional view of part of extrusion apparatus to forming single plain walled tube including a sizing plug according to the invention.

When conventional single plain wall pipe forming apparatus as shown in simplified sketch of FIG. 2, cooling of pipe 50, from extrusion head 51 around sizing plug 52 is often by means of a cooling jacket 53. In this case suction may be applied to sizing plug 52 through conduit 54 and surface channels 55. Conduit 54 may or may not branch into two branches as shown or into more branches to apply suction in stages as discussed with reference to FIG. 1. The plug 52 is conveniently a cooling plug having liquid channel 57 for cooling liquid may be drawn to the surface through small suction channels 58 similar to channels 30 previously mentioned, for lubrication or other purposes.

The provision of a cooling internal sizing plug in otherwise conventional apparatus for producing single plain walled pipe makes it unnecessary that outer diameter former should include a water jacket such as jacket 53. This may be replaced by a simple uncooled former. In some cases it is envisaged that the outer former may be dispensed with entirely.

Figure 6:
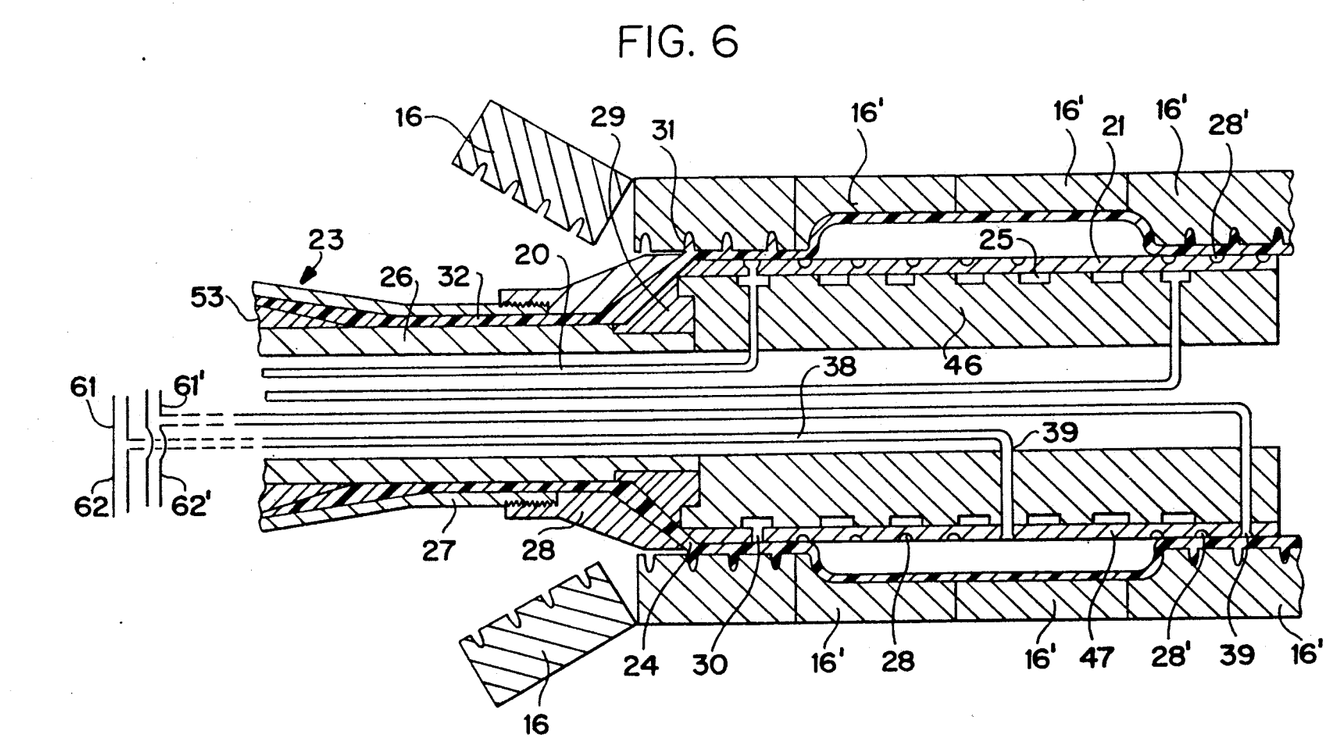
FIG. 6 is a sketch similar to FIG. 1 showing formation of a bell under pressure.

While FIGS. 1 and 2 show the apparatus using suction, FIG. 6 shows the apparatus using pressure. Especially formed molds 16' of the travelling mold are provided for the formation of bells. The plastics material is forced thereinto under pneumatic pressure from channel 28. The apparatus of FIG. 6 also differs from that of FIG. 1 in that conduits 39 in FIG. 1 are branches of conduit 38. Thus, when using the apparatus of FIG. 1 only vacuum or pneumatic pressure may be applied in channels 28 from a single source. Moreover the pressure of either the vacuum or pneumatic pressure in the channels 28 at one end of the cooling plug 46 is not independently adjustable in the apparatus illustrated in FIG. 1. In FIG. 6, however, the channels 28' at the downstream end of plug 46 are, through conduit 39', independently connected to separate sources of vacuum or pneumatic pressure through respective branch conduits 61', 62'. Similarly upstream channels 28 are connected through conduits 39 and 38 to branch conduits 61, 62 for application of vacuum or pneumatic pressure respectively.

FIG. 6 apparatus allows independent regulation of either vacuum or pneumatic pressure at opposite ends of the cooling plug 46 and also makes it possible to apply vacuum at one end of cooling plug 46 and pneumatic pressure at the other end.

FIG. 6 illustrates the formation of a bell in annularly ribbed pipe and the application of vacuum through channels 28, 28' when no bell is required, aiding the formation of a smooth inner wall of the resulting tube. Cooperating mold blocks 16' providing for molding a bell are provided in the endless mold block systems. When these molds 16' are located as shown in FIG. 6, vacuum applied through branch conduit 61 is turned off and pneumatic pressure is applied through branch conduit 62'. Vacuum may suitably be retained in branch conduit 61' leading to channels 28' to aid in drawing the tube back to the outer surface of the cooling plug 46 when bell formation is no longer required.

Figure 7:
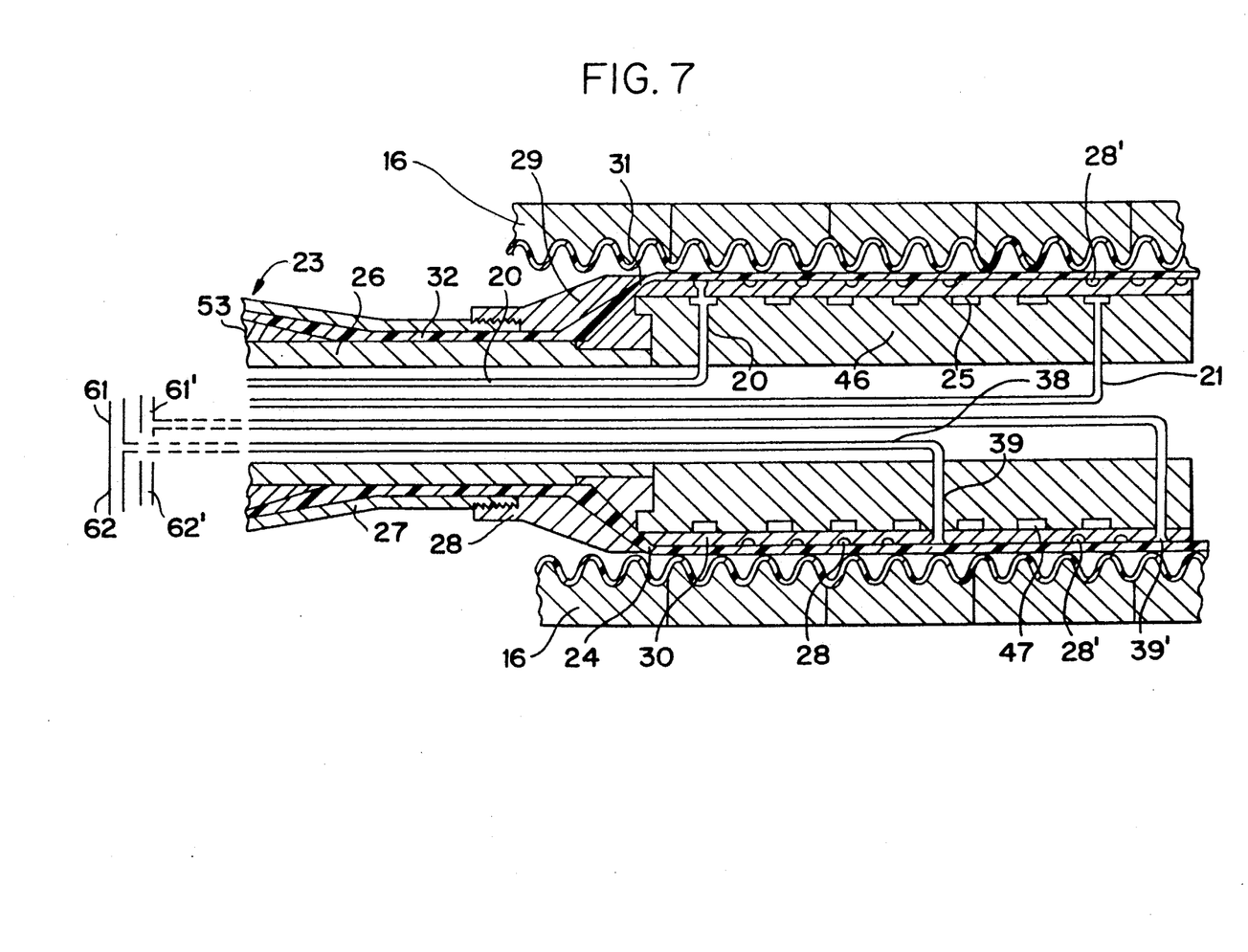
FIG. 7 is a view similar to that of FIG. 1 but showing the formation of corrugated double walled tubing.

FIG. 7 shows a similar apparatus to that of FIG. 6 but the FIG. 7 apparatus is for the formation of double walled corrugated tubing.

FIG. 7 shows the apparatus used with suction applied at both channels 28 and 28' intended to provide a tube with smooth inner walls. The outer corrugated wall is formed from an outer plastic parison 70 extruded upstream of the inner extrudate 31 and biased into the mold in any suitable manner.

Figure 8:
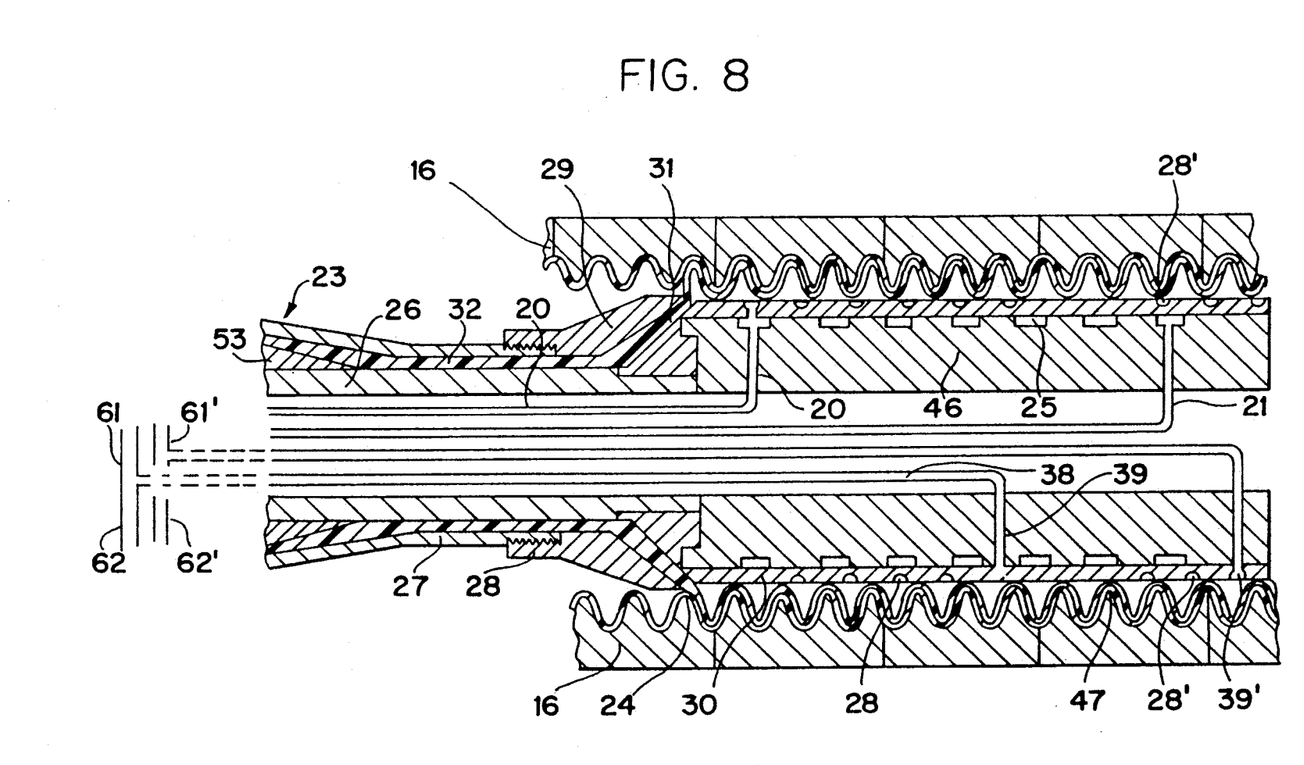
FIG. 8 shows the apparatus of FIG. 7 but under pressure rather than vacuum.

If suction is replaced by pneumatic pressure at channels 28, 28' the inner tube will be biased into the corrugations to the outer tube as shown in FIG. 8 to form a two ply corrugated tube.

Figure 9:
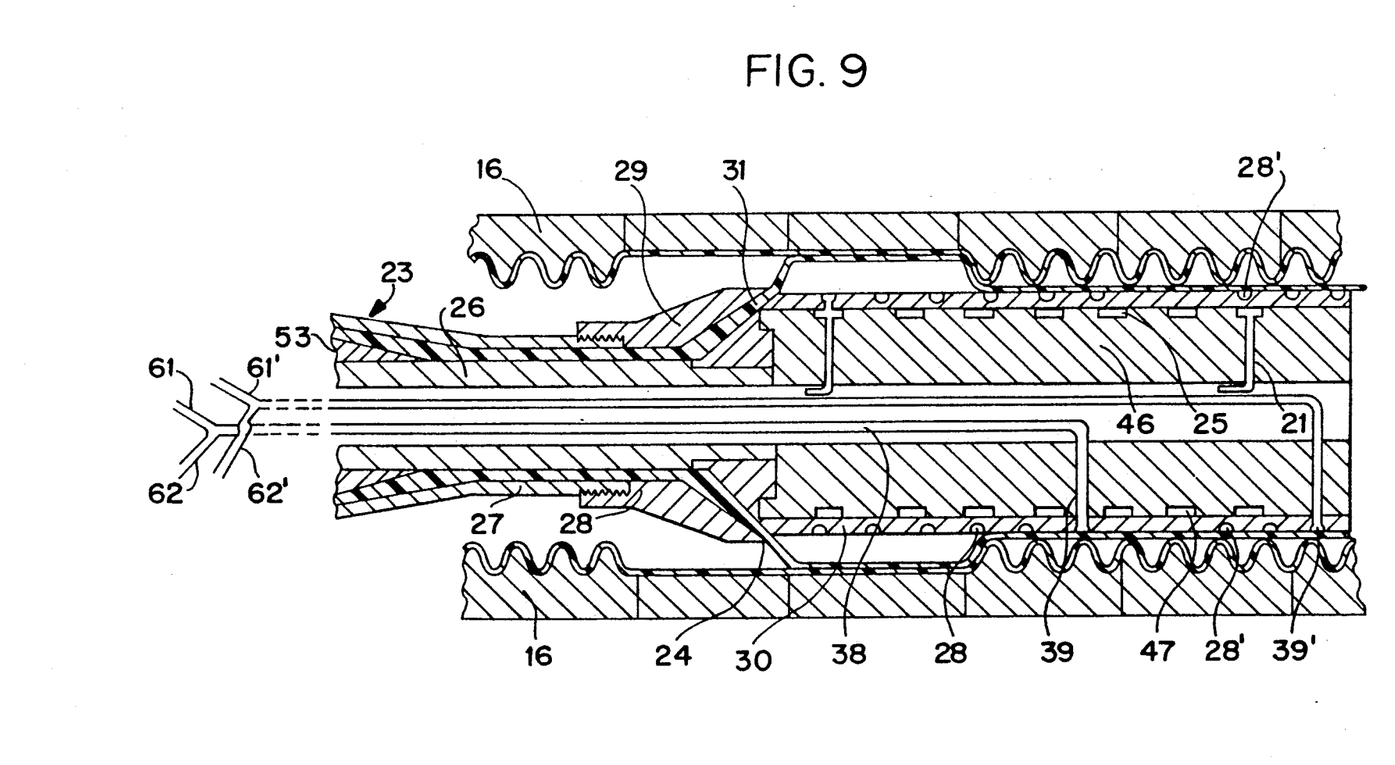
FIG. 9 shows the formation of a bell apparatus of FIG. 7.

While uses for such two ply corrugated tube can be envisaged, the use of pneumatic pressure is probably more useful for bell formation as shown in FIG. 9. In this case mold blocks 16' are provided for bell formation and the outer parison is forced into them by conventional or other suitable means. Thereafter, when mold blocks 16' are located as shown in FIG. 9, pneumatic pressure is applied at channels 28 rather than suction. Again, it is preferable that suction be maintained at channels 28' to help bring the tube back to the surface of plug 46 as desired.

It may be seen that various modifications may be made without departing from the scope of the invention. As shown, only two independent sets of channels 28, 28' are shown but it is clear that more than two sets are possible to add to the permutations and combinations of pressure and vacuum which may be applied.

Moreover, while FIG. 3 shows one illustration of plug 46 having simple helical channels 28, these channels may have various forms to cover the surface of plug 46. Preferably, channels 28 may comprise two intercepting helical channels of opposite twist as show in FIG. 11.

Figure 10:
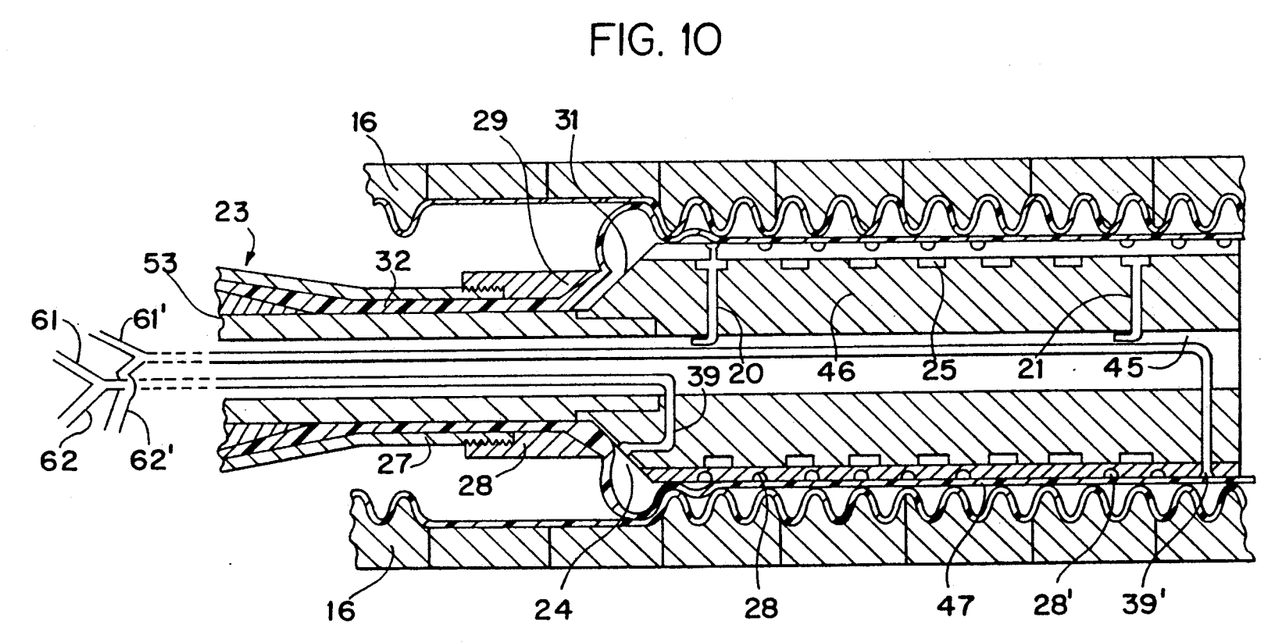
FIG. 10 shows a variation in bell formation using a cooling plug having a forward pressure outlet.

FIG. 10 shows a modification in which pressure is applied from an upstream front end of the plug 46. In this case bell formation of the inner parison may be prior to or at the point of entry into the channel between the mold and the plug 46. The inner parison will tend to balloon in an upstream direction to line bell 72. It is believed that certain advantages may derive from this embodiment.

FIGS. 11 and 12 shown a modification of the apparatus of FIG. 1 showing an unbranched passage 38 to annularly arranged reservoir which opens to annular channel 60 by a number of ports 64. Annular channel 60 provides a main source of suction/pressure which, through channel 28, diminishes in an upstream direction.

I claim:

1. A method for forming a seamless thermoplastic tube, comprising:

extruding a tubular parison of heated thermoplastic into a tubular mold;

shaping the parison by passing it about the outer surface of a core plug which is disposed within the mold;

applying suction to an inner wall of the shaped tube at least one suction port in communication with fluid communication channels and a suction branch channel to provide suction of diminishing strength upstream of the port and, in intervals when an enlarged diameter is required, alternatively applying pressure through the fluid communication channels and a pressure branch channel.

2. A method as claimed in claim 1 in which the mold is a travelling mold having linked mold blocks.

3. A method as claimed in claim 2 in which pneumatic pressure or suction are independently applied through channels at different parts at the outer surface of the plug.

4. A method as claimed in claim 3 in which pneumatic pressure or suction are independently applied at upstream and downstream parts of the outer surface of the plug.

5. A method for forming a seamless thermoplastic tube having at least one bell therein, comprising:

extruding a tubular parison of heated thermoplastic material into a travelling mold tunnel comprising cooperating runs of interlinked mold blocks;

passing the parison about the outer surface of a core plug within the tube to form a shaped tube in the travelling mold tunnel which includes bell forming mold blocks to mold the outer surface of said bell;

applying pneumatic pressure through a number of fluid communication channels within the plug over at least a portion of the outer surface thereof adjacent the bell forming mold blocks; and applying suction from a port in fluid communication with the fluid communication channels through the fluid communication channels to provide suction of diminishing strength upstream of the port when the non-bell forming blocks are adjacent the tube;

where the application of pressure and suction promote shaping of the parison.

6. A method as claimed in claim 5 forming single walled tube.

7. A method as claimed in claim 5 for forming double wall corrugated tube.

8. A method as claimed in claim 5 in which the pneumatic pressure is applied at an upstream portion of the plug and suction is applied at a downstream portion of the plug.

9. The method of claim 1 further including the step of providing a small amount of cooling liquid to the outer core plug surface.

10. The method of claim 5 further including the step of providing a small amount of cooling liquid to the outer core plug surface.

* * * * *